United States Patent [19]

Shenk

[11] 4,046,225

[45] Sept. 6, 1977

[54] CABLE LUBRICATION METHOD

[75] Inventor: Walter James Shenk, Millington, N.J.

[73] Assignee: Bell Telephone Laboratories, Incorporated, Murray Hill, N.J.

[21] Appl. No.: 603,279

[22] Filed: Aug. 11, 1975

[51] Int. Cl.² .............................................. F16N 7/00
[52] U.S. Cl. .................................. 184/15 R; 184/1 E
[58] Field of Search ................. 184/15 R, 15 A, 16, 184/1 E, 28, 1 R; 74/182, 18; 118/404, 405, DIG. 11, DIG. 19; 221/47; 15/269; 166/14; 77/55

[56] References Cited

U.S. PATENT DOCUMENTS

| 381,804 | 4/1888 | Marshall | 184/28 |
|---|---|---|---|
| 1,520,745 | 12/1924 | Bowden | 221/47 |
| 2,083,937 | 6/1937 | Begg | 184/15 R |
| 2,194,565 | 3/1940 | Moss | 15/269 |
| 2,257,432 | 9/1941 | Smith | 118/DIG. 11 |
| 2,284,869 | 6/1942 | Hinderliter | 166/14 |
| 2,331,983 | 10/1943 | Kaiser | 118/404 |
| 2,418,646 | 4/1947 | Janson | 77/55 |
| 2,753,839 | 7/1956 | Clark | 184/1 R |
| 3,552,212 | 1/1971 | Ohlin | 134/64 |
| 3,840,384 | 10/1974 | Reade et al. | 118/405 X |
| 3,899,384 | 8/1975 | Kelly | 118/405 X |

Primary Examiner—Harland S. Skogquist
Assistant Examiner—William R. Browne
Attorney, Agent, or Firm—J. S. Cubert

[57] ABSTRACT

A method for applying lubricant to the surface of a cable in which the cable is inserted into a lubricant filled chamber through the deformably engaged aperture of a first flexible disc. Beads of lubricant from the chamber are applied to the cable surface through a plurality of radial slits cut through a second flexible disc as the cable exits from the chamber. The exited cable passes through the deformable aperture of a third disc having radial slits cut therethrough in rotatably displaced relationship to the radial slits of the second disc to uniformly spread the lubricant beads on the cable surface.

5 Claims, 3 Drawing Figures

U.S. Patent
Sept. 6, 1977
4,046,225
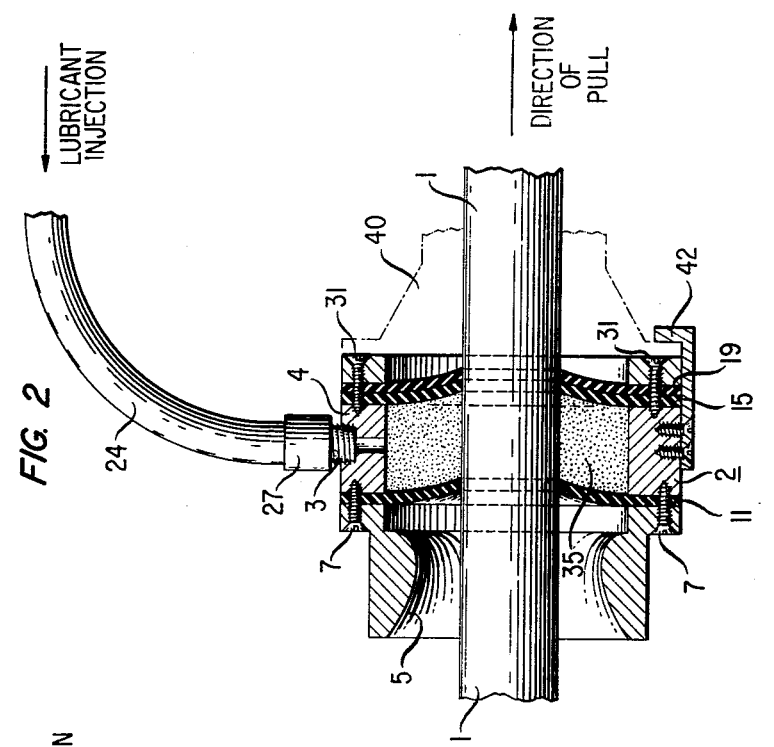
FIG. 2
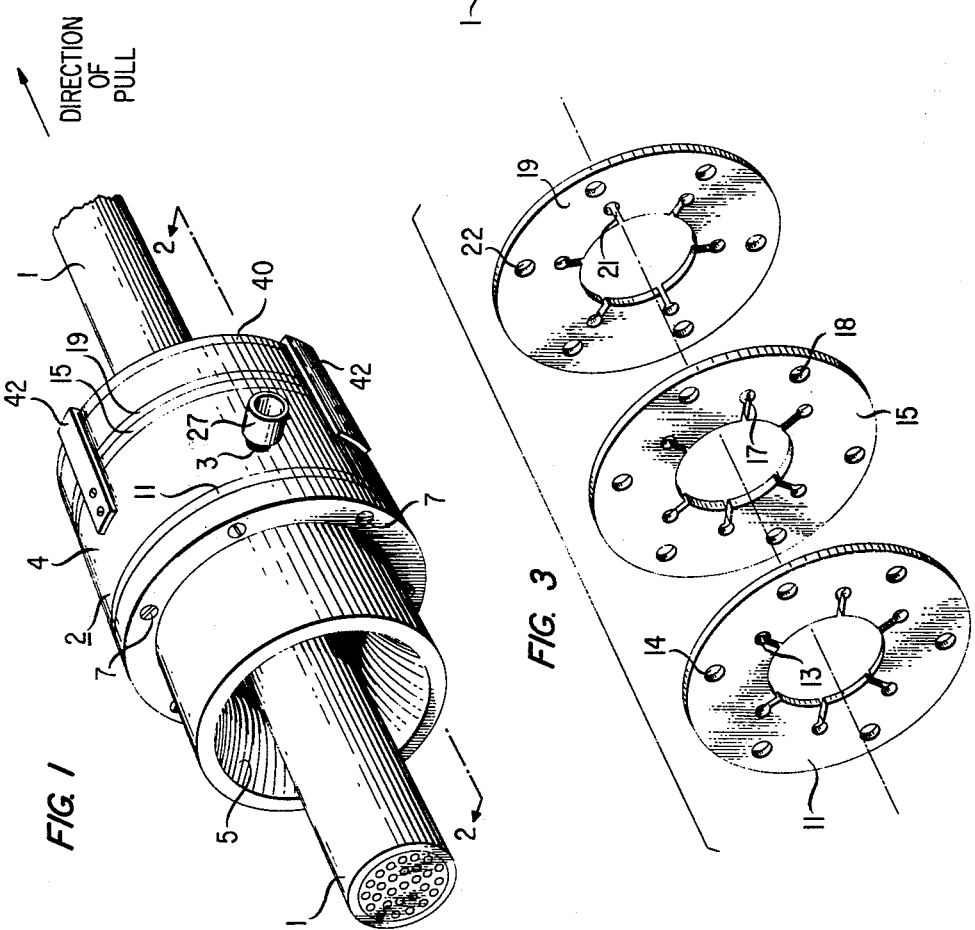
FIG. 1
FIG. 3

CABLE LUBRICATION METHOD

BACKGROUND OF THE INVENTION

My invention relates to the application of lubricating material to objects and more particularly to a method and apparatus for applying lubricant to the surface of a cable.

In electrical and communucation systems, it is often necessary to pull extensive lengths of smooth-surfaced cable through a relatively narrow cross-section conduit. Friction between the cable surface and the conduit requires very high pulling forces, makes cable installation difficult, and can result in damage to the cable. Where the surface of the cable is lubricated prior to insertion in the conduit, the pulling force and the possibility of damage are considerably reduced. Generally, lubricant has been manually spread on the cable surface to ensure a uniform coating. The manual method, however, is time consuming and results in a non-uniform lubricant coating.

Mechanical aids to the manual lubricating process, such as funnels, have been devised to expedite the application of lubricant. But the use of a funnel having an end closely conforming to the surface of the cable does not result in automatic spreading of the lubricant on the cable unless some external device is used to force the lubricant down the funnel onto the smooth cable surface. If the cable includes periodically occurring expanded sections such as couplings or joints, the expanded sections may be operative to drive the lubricant into the narrow section of the funnel and onto the cable surface. Where the smooth-surfaced cable is of relatively constant cross section, the lubricant applicator requires a complex mechanical arrangement to force the lubricant onto the cable surface in a uniform manner. It is an object of the invention to provide a simple and economical arrangement for uniformly dispensing lubricant onto a smooth cable surface during insertion of the cable into a closely conforming conduit.

SUMMARY OF THE INVENTION

The invention is directed to a method for applying a lubricating material to the surface of a cable in which the cable is moved through a passageway in a housing. A lubricant chamber is formed by attaching first and second flexible annular discs to a housing thereby defining the passageway through the chamber. Each disc includes a plurality of radial slits around the inner circumference thereof and the inner circumferences of the discs engage the cable surface. Lubricant is directed into the chamber through an aperture in the housing. At least one additonal flexible annular disc placed outside the chamber in the vicinity of the second disc includes a plurality of radial slits around its inner circumference, said additional disc radial slits being rotatably displaced from the second disc radial slits. Passage of the cable through the innner circumference of the second disc results in a plurality of lubricant beads around the cable circumference. The lubricant from the beads is spread uniformly on the surface of the cable by passage of the cable through the additional flexible disc.

According to one aspect of the invention, the method includes the use of a housing which is generally cylindrical in shape and includes a tubular cable passageway along its longitudinal axis. Said first and second discs are fixedly attached at their outer circumferences to the housing in spaced relationship perpendicular to the longitudinal axis of the housing and the additional disc is fixedly attached to the housing along its outer circumference outside the chamber in the vicinity of the second disc.

According to another aspect of the invention, the method for applying lubricant to a cable includes the use of annular discs which are smaller than the diameter of the cable drawn therethrough, whereby the discs deformably engage this cable and the radial slits therein are spread. The spreading of the radial slits of the second disc causes lubricant beads to form on the surface of the cable, which beads are uniformly spread on the cable surface by the deformed inner circumferential sections between the rotatably displaced slits of the additional disc.

According to yet another aspect of the invention, the diameter of the passageway through the additional disc through which the lubricant beaded cable passes is smaller than the passageway diameter of the second disc to increase the lubricant spreading during passage of the cable through the additional disc.

According to yet another aspect of the invention, the method for applying lubricant to a cable includes the use of an additional disc through which the lubricant beaded cable passes and which is made of more flexible material than the first and second discs to provide more uniform spreading of the lubricant onto the surface of the cable.

According to yet another aspect of the invention, the method for applying lubricant to a cable includes the use of an additional disc which is juxtaposed with the second disc and the radial slits of said second and additional discs are placed in uniformly staggered relationship.

BRIEF DESCRIPTION OF THE DRAWINGS

FIG. 1 is a perspective view of a cable lubricating arrangement illustrative of the invention;

FIG. 2 shows a detailed cross-section view of the arrangement of FIG. 1 taken along lines 2—2; and FIG. 3 shows a perspective view of the arrangement of the flexible annular discs with radial slits of the cable lubricator of FIG. 1.

DETAILED DESCRIPTION

FIG. 1 shows a section of cable 1 positioned in a cable lubricator illustrative of the invention. The left portion of cable 1 may be extended to a supply of cable and the right portion may be extended into a conduit (not shown) through which the cable is pulled. Cable 1 enters the lubricator through flared annular entrance 5 which directs the cable section into lubricator chamber 2 with due allowance for the initial direction of the entering cable. Lubricant is introduced into chamber 2 through inlet 3 in the housing, and L-shaped clamps 42 are adapted to secure cable feeder 40 to the lubricator as indicated in FIG. 2. Cable feeder 40 is useful in guiding the lubricated cable as it exits from chamber 2 prior to insertion into the conduit through which the cable is drawn.

Referring to FIG. 2, chamber 2 comprises cylindrical housing 4 connected between flared section 5 and feeder 40. Flexible annular disc 11 forms one end of chamber 2 and is fixed in place by means of spaced holes 14 disposed along its outer circumferential section. Flared entrance 5 is connected to chamber 2 via bolts 7, which bolts are threaddedly engaged in the entrance end of the chamber housing through holes 14 of disc 11.

Bolts 7 secure entrance 5 to the chamber and hold disc 11 in place. Similarly, flexible annular disc 15 is attached to the exit end of chamber 2. It is held in place by means of bolts 31 which are threadedly engaged in the exit end of the chamber through holes 18 which are disposed along the outer circumference of disc 15. Disc 11 includes spaced radial slits 13 disposed around the inner circumference thereof and disc 15 includes radial slits 17 similarly disposed around its inner circumference. While, as indicated in FIG. 3, discs 11 and 15 each contain the same number of radial slits and said slits are in alignment, it is to be understood that other arrangements of slits may be utilized.

A suitable lubricating material such as Bentonite is injected into chamber 2 via tube 24, coupling 27, and inlet 3. The lubricant is forced into tube 24 and fills the chamber between discs 11 and 15 in the presence of cable 1. Flexible annular disc 19 is juxtaposed with disc 15 outside chamber 2 as shown in FIG. 2. It is to be understood, however, that disc 19 may be spaced from disc 15 and that other discs may be added outside chamber 2.

Holes 22 in flexible annular disc 19 are aligned with the holes in discs 11 and 15, as indicated in FIG. 3, but the radial slits of disc 19 disposed along the inner circumference thereof are rotatably displaced from the radial slits in disc 15 so that the radial slits of disc 19 are in staggered relation with the radial slits of disc 15. Bolts 31 fix disc 19 in place next to disc 15 through holes 22. In the event that additional discs are used, the radial slits of said additional discs are rotatably displaced from the slits of the adjacent discs and these discs as well as discs 11, 15 and 19 may be attached to the lubricator by means well known in the art other than threadedly engaged bolts.

The inner diameter of each radial disc is selected to be smaller than the outer diameter of the cable to be drawn through the passageway of chamber 2. Thus the flexible discs are deformed by the passage of cable 1, as shown in FIG. 2, and lubricant 35 contained in chamber 2 between discs 11 and 15 can exit from the chamber only via the radial slits of the deformed discs. The deformation of the discs resulting from the cable passage causes the radial slits to be spread and the spreading of the radial slits in disc 15 produces beads of lubricant on the surface of the cable passing through slits 17. These lubricant beads then come into contact with the inner edge sections of disc 19 between slits 21 since slits 21 of disc 19 are circumferentially displaced from slits 17 of disc 15. The inner circumferentially sections of disc 19 deformably engage the surface of cable 1 and tightly conform thereto. Disc 15 prevents the flow of lubricant back into chamber 2. Consequently, the lubricant beads deposited on cable 1 by disc 15 are directed toward and spread on the surface of said cable as its passes through the deformably engaged sections of disc 19 between the radial slits thereof. In this manner, a uniform coating of lubricant is placed on the cable so long as chamber 2 is kept filled with lubricant and the spreading of the lubricant is obtained by the action of discs 15 and 19 independent of the smoothness of the outer surface of the cable.

The amount of lubricant in chamber 2 is controlled by observation of disc 11. As long as lubricant appears at slits 13 of disc 11, lubricant chamber 2 is sufficiently filled to assure uniform cable lubrication. The lubricant may be injected into chamber 2 by means of a pump or by other methods well known in the art and the lubricant is supplied via tube 24. The entire apparatus including the lubricator, the pumping device and the lubricant source may be portable and can be readily assembled at the site of the cable installation.

Discs 11, 15 and 19 may be made of neoprene or other flexible material formed into the desired annular shape. Disc 19 may be made more flexible than discs 11 and 15 to provide a more uniform application of lubricant to the cable. As is readily apparent from FIG. 2, a set of annular slitted discs in the lubricator can accommodate a relatively wide range of cable diameters without affecting the operation of the lubricator, and a large change in cable diameter can be accommodated by an on-site change to discs with different inner diameters.

In operation, cable 1 enters flared section 5 and is passed through lubricant chamber 2 having lubricant in the space defined by cylindrical housing 4 and flexible annular discs 11 and 15. The third annular disc is placed adjacent to disc 15 on the outside of the chamber. Each disc is deformed by the passage of the cable therethrough and the lubricant in the chamber is forced through the spread slits of deformed disc 15 so that a plurality of lubricant beads is deposited on the cable surface passing through disc 15. Since the radial slits of disc 19 are rotatably displaced from the radial slits of disc 15, the lubricant beads on the cable are spread around the circumference of the cable by the flexible sections between the radial slits of disc 19.

The alignment of flexible annular discs 11, 15, and 19 in the cable lubricator of FIG. 1 is shown in FIG. 3. The discs have the same outer diameters, and the holes disposed around the outer circumference of each disc are arranged so that the centers of the discs coincide with the common longitudinal axis of cylindrical housing 4 and entrance 5. Radial slits 13, 17, and 21, located around the inner circumferences of discs 11, 15, and 19, respectively, are relatively narrow and separate the inner circumferences of the discs into deformable sections. The lengths of the radial slits are selected to permit a range of cable sizes to pass through the discs in a manner that allows proper deformation of the inner circumferential sections thereof. Each slit is terminated in a circular cut-out section to prevent tearing of the disc in the vicinity of the slits. The rotational displacement of slits 21 in disc 19 with respect to slits 17 in disc 15 results in the automatic spreading of lubricant on the surface of the cable exiting from disc 19 of the lubricator.

The invention has been described with reference to a particular embodiment illustrative thereof. It is to be understood that modifications and changes may be made by those skilled in the art without departing from the scope and spirit of the invention.

I claim:

1. A method for applying lubricant to the surface of a cable comprising the steps of attaching spaced first and second flexible annular discs each having a plurality of radial slits cut therethrough disposed along its inner circumference to a housing forming a chamber between said discs, the inner circumferences of said discs defining a cable passageway through said chamber; attaching at least one additional annular disc of greater flexibility than said second flexible annular disc having a plurality of radial slits cut therethrough disposed along its inner circumference adjacent to said second annular disc so that the radial slits of said additional disc are rotatably displaced from the radial slits of said second disc; feeding said cable of greater diameter than said cable passageway in said discs into said chamber through said passageway from said first disc to said third disc; and injecting lubricant into said chamber through an inlet in housing, said lubricant beads being deposited on said cable through the radial slits of said second annular disc and said lubricant being uniformly spread onto the surface of said cable by said additional greater flexibility annular disc.

2. A method for dispensing a lubricant on the surface of a cable comprising the steps of passing said cable into a chamber filled with a lubricant through the deformably engaged aperture of a first flexible disc; applying beads of lubricant from said chamber to the surface of said cable through a plurality of radial slits cut through a second flexible disc at the exit of said chamber as said cable exits from said chamber through the deformably engaged aperture of said second flexible disc which aperture is in communication with said second disc radial slits; and passing said exited cable through the deformable aperture of a third disc of greater flexibility than said second disc with radial slits cut therethrough in rotatably displaced relationship to the radial slits of said second disc and in communication with said third disc aperture to uniformly spread said lubricant beads on the surface of said cable.

3. A method for dispensing a viscous lubricant on the surface of a circular cross-section cable comprising the steps of feeding said cable into a chamber containing said lubricant through a smaller than cable-diameter aperture of a first flexible annular disc having radial slits cut therethrough in communication with said aperture; exiting said cable from said chamber through the smaller than cable-diameter aperture of a second flexible annular disc having radial slits cut therethrough in communication with said aperture; depositing a plurality of beads of lubricant from said chamber onto the surface of said exiting cable through said second annular disc radial slits; and feeding said cable through the deformable smaller than cable-diameter aperture of a third annular disc of greater flexibility than said second annular disc having radial slits cut therethrough in communication with said deformable aperture and in rotatably displaced relationship to said second annular disc radial slits to uniformly spread said lubricant on said cable surface.

4. A method for dispensing a viscous lubricant on the surface of a cable according to claim 3 further comprising the step of injecting said viscous lubricant into said chamber.

5. A method for dispensing a viscous lubricant on the surface of a circular cross-section cable comprising the steps of passing said cable through the aperture of a deformably engaged first flexible annular disc having radial slits cut therethrough in communication with said aperture into a viscous lubricant-filled chamber; depositing beads of the lubricant from said chamber on the surface of said cable through a plurality of radial slits cut through a second flexible annular disc having an aperture therein in communication with said radial slits as said cable exits from said chamber, the edges surrounding said aperture being deformably engaged with the surface of said cable; and uniformly spreading said deposited viscous lubricant from said beads on said exited cable surface by passing said exited cable through the smaller than cable-diameter aperture of a deformable third annular disc of greater flexibility than said second annular disc having radial slits cut therethrough in communication with said aperture, which third disc radial slits are rotatably displaced with respect to said second annular disc radial slits.

* * * * *